United States Patent Office 3,636,134
Patented Jan. 18, 1972

3,636,134
ROOM TEMPERATURE VULCANIZABLE ACE-
TOXYSILOXANE BLOCK COPOLYMER
Robert C. Antonen, Midland, Mich., assignor to Dow
Corning Corporation, Midland, Mich.
No Drawing. Filed Dec. 1, 1969, Ser. No. 881,319
Int. Cl. C08g 47/02, 47/06
U.S. Cl. 260—825                           28 Claims

ABSTRACT OF THE DISCLOSURE

A room temperature vulcanizable acetoxysiloxane block copolymer of a polydiorganosiloxane block and a monoorganosiloxane block being endblocked with monoorganoacetoxysiloxane units is useful as an adhesive.

This invention relates to a room temperature vulvanizable organosiloxane composition which is a block copolymer.

Acetoxy functional silanes and siloxanes are known in the art. The acetoxy functional silanes are known as being useful in cross-linking polymers in the production of room temperature vulcanizable silicone rubber. Furthermore, acetoxysilanes have been used in cross-linking siloxane resins. Acetoxysiloxanes are known particularly as room temperature vulcanizable silicone rubber. Although the acetoxysiloxanes have been described as having some adhesive property, the prior art has not shown acetoxysiloxane composition with outstanding adhesive properties.

It is quite unexpected that an acetoxysiloxane could be obtained which prossessed outstanding adhesive properties compared to prior art compositions. It is therefore an object of the present invention to provide a room temperature vulcanizable acetoxysiloxane which is useful as an adhesive.

This invention relates to a room temperature vulcanizable composition stable in the absence of moisture and curable upon exposure to moisture consisting essentially of an organosiloxane block compolymer consisting essentially of (A) 16 to 84 inclusive mol percent of diorganosiloxane units wherein the diorganosiloxane units are bonded through silicon-oxygen-silicon bonds forming a polydiorganosiloxane block having a average of from 6 to 350 inclusive diorganosiloxane units per block, said polydiorganosiloxane being at least 80 mol percent dimethylsiloxane units based on the total number of siloxane units in the polydiorganosiloxane and any remaining being selected from the group consisting of phenylmethylsiloxane units and monomethylsiloxane units, (B) 11 to 77 inclusive mol percent organosiloxane units having an average formula

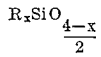

where $x$ has a value of from 1 to 1.3 inclusive and R is an organic group selected from the group consisting of aryl redicals, methyl radicals, vinyl radicals, ethyl radicals and propyl radicals, said organic groups being at least 50 percent aryl radicals based on the total number of organic groups in (B), said organosiloxane units comprise a block of at least 3 organosiloxane units, and said organosiloxane units being selected from monoorganosiloxane units and diorganosiloxane units, and (C) 2 to 27 inclusive mol percent of endblocking acetoxysiloxane units of the formula

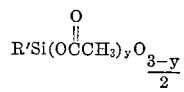

where $y$ has an average value from 1.8 to 2 inclusive and R' is an organic radical selected from the group consisting of alkyl radicals having from 1 to 5 inclusive carbon atoms, phenyl radicals and vinyl radicals, the mol percentages of (A), (B) and (C) being based on the total number of siloxane units in the organosiloxane block copolymer.

The room temperature vulcanizable composition of the present invention can be prepared by several methods. The best method is to couple a hydroxyl terminated polydiorganosiloxane with an aromatic containing organosiloxane resin having hydroxyl groups by reaction with a trifunctional organosilane. The resulting block copolymer is hydroxylated and this block copolymer is then reacted with monoorganotriacetoxysilane to yield the room temperature vulcanizable composition. Alternatively the hydroxyl terminated polydiorganosiloxane can be coupled and cohydrolyzed with a trifunctional organosilane in the proper proportions. In the methods for making the room temperature vulacnizable composition of the present invention, conditions which cause siloxane bond rearrangement should be avoided.

The preparations of the room temperature vulcanizable compositions of the present invention begin with a polydiorganosiloxane which is terminated by hydroxyl radicals or hydrolyzable groups. The polydiorganosiloxanes suitable for the present invention have an average of from 6 to 350 diorganosiloxane units per molecule, preferably from 25 to 100 diorganosiloxane units per molecule. The polydiorganosiloxanes are at least 80 mol percent dimethylsiloxane units. Any remaining siloxane units can be phenylmethylsiloxane units or monomethylsiloxane units. The polydiorganosiloxanes preferably are all dimethylsiloxane units. The phenylmethylsiloxane units or the monomethylsiloxane units are present in amounts of 10 mol percent or less each. Preferably, the monoorganosiloxane is absent or present in small amounts, such as less than 2 mol percent. The terminating groups for the polydiorganosiloxanes can be hydroxyl radicals or any hydrolyzables group. Examples of hydrolyzable groups include halogen such as chlorine, alkoxy; such as methoxy and ethoxy, acyloxy such as acetoxy, ketoxime such as methylethylketoxime and the like.

The polydiorganosiloxanes are employed in the preparation to provide the final room temperature vulcanizable composition with from 16 to 84 mol percent diorganosiloxane units derived from the polydiorganosiloxane, preferably from 37 to 65 mol percent. The mol percent of diorganosiloxane units includes any quantity of monomethylsiloxane units or phenylmethylsiloxane units in the polydiorganosiloxane. The polydiorganosiloxane forms one of the blocks of the block polymer of the present invention. Since siloxane bond rearrangement conditions are avoided in the preparation of the room temperature vulcanizable ccmposition of the present invention, the polydiorganosiloxanes essentially retain their original composition except for the terminating functional groups, as illustrated by the hydroxyl radicals and hydrolyzable groups. The polydiorganosiloxanes are well known in the art and can be obtained commercially.

The other block of the block copolymer of the present invention can be represented by an average unit formula

where R is an aryl radical, methyl, vinyl, ethyl or propyl and $x$ has an average value of from 1 to 1.3. Any aryl radical is suitable for the present invention and include for example, such species as phenyl, tolyl, xylyl, xenyl, naphthyl and anthracyl. The organic radicals which are represented in the formula by R are at least 50 percent aryl and preferably at least 80 percent of the organic radicals are aryl. The organosiloxane units of (B) can all be the same, aryl, or can be mixtures of various organosiloxane units, however, the organosiloxane units are monoorganosiloxane units or diorganosiloxane units. Illustrative examples of the organosiloxane units in (B) are monoorganosiloxane units such as phenylsiloxane, tolylsiloxane, xylylsiloxane, xenylsiloxane, naphthylsiloxane, methylsiloxane, ethylsiloxane, propylsiloxane; and diorganosiloxane units such as dimethylsiloxane, diethylsiloxane, diphenylsiloxane, dinaphthylsiloxane, methylphenylsiloxane, methylethylsiloxane, methylpropylsiloxane, methyltolylsiloxane, methylnaphthylsiloxane, ethylphenylsiloxane, propyltolylsiloxane, ethylpropylsiloxane and methylxenylsiloxane. Small amounts of other siloxane units, such as triorganosiloxane units and $SiO_2$ units, as well as, monoorganosiloxane units and diorganosiloxane units with other organic groups can be tolerated up to amounts of 1 or 2 mol percent without departing from the present invention.

The organosiloxane units of block (B) are present in amounts sufficient to provide the room temperature vulcanizable composition of the present invention with from 11 to 77 mol percent organosiloxane units, preferably from 25 to 52 mol percent.

Block (B) consists of at least 3 organosiloxane units per block. The average size of polymer block (B) is dependent upon the method of preparation and also dependent upon the average size of the polydiorganosiloxane blocks of (A) and the mol percentage of organosiloxane units of (B).

The endblocking acetoxysiloxane units of (C) are represented by the average unit formula

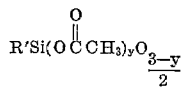

where $y$ has an average value of from 1.8 to 2 inclusive and R′ is an organic radical selected from alkyl radicals having from 1 to 5 inclusive carbon atoms, phenyl radicals and vinyl radicals. The alkyl radicals include both straight and branched radicals, such as methyl, ethyl, propyl, isopropyl, butyl and pentyl. The endblocking acetoxysiloxane units can be illustrated by methyldiacetoxysiloxane, ethyldiacetoxysiloxane, propyldiacetoxysiloxane, butyldiacetoxysiloxane, pentyldiacetoxysiloxane, methylmonoacetoxysiloxane, ethylmonoacetoxysiloxane, phenyldiacetoxysiloxane, vinyldiacetoxysiloxane, propylmonoacetoxysiloxane, phenylmonoacetoxysiloxane, butylmonoacetoxysiloxane, vinylmonoacetoxylsiloxane and pentylmonoacetoxysiloxane. The endblocking acetoxysiloxane units are essentially all monoorganodiacetoxysiloxane units with the exception that some of the endblocking acetoxysilanes used in the preparation can react with, for example, two hydroxyl radicals and thus small amounts of monoorganomonoacetoxysiloxane units can be present. The endblocking acetoxysiloxane units are present in amounts sufficient to provide the room temperature vulcanizable composition with from 2 to 27 inclusive mol percent based on the total number of siloxane units in the organosiloxane block copolymer. Preferably from 2 to 25 inclusive mol percent of the endblocking acetoxysiloxane units are present.

In the preparation of the room temperature vulcanizable composition of the present invention a block copolymer is first prepared consisting essentially of the blocks described in (A) and (B). There are a number of methods known for the preparation of the block copolymer described by (A) and (B). The best method for preparing the block copolymer is to react under anhydrous conditions a hydroxyl terminated polydiorganosiloxane with a trifunctional silane, such as, methyltriacetoxysilane, phenyltriacetoxysilane, vinyltriacetoxysilane, methyltri(methylethylketoxime)silane, phenyltrimethoxysilane, methyltriethoxysilane and the like. Sufficient trifunctional silane is added to provide one mole of silane per mole of hydroxyl of the polydiorganosiloxane. The reaction product is a monoorganodifunctional siloxy endblocked polydiorganosiloxane. The monoorganodiketoximesiloxy endblocked polydiorganosiloxanes are further described in U.S. Pat. No. 3,184,427 and U.S. Pat. No. 3,189,576 which are hereby incorporated by reference. The monoorganodiacetoxysiloxy endblocked polydiorganosiloxanes are further described in U.S. Pat. No. 3,035,016 which is hereby incorporated by reference. The monoorganodialkoxysiloxy endblocked polydiorganosiloxanes are further described in U.S. Pat. No. 3,161,614 and U.S. Pat. No. 3,170,894 which are hereby incorporated by reference.

The monoorganodifunctional siloxy endblocked polydiorganosiloxane is then coupled to a hydroxylated organosiloxane which falls within the scope defined in (B). The coupling can take place in the presence of suitable catalyst for such reactions as described in the patents cited above. Amines are particularly suitable for promoting the reaction between the acetoxy groups and the silicon-bonded hydroxyl radicals. For example, the amines can be pyridine, alpha-picoline, and n-butylamine. Small amounts of the amines are suitable, such as 0.05 to 0.5 weight percent based on the weight of the reactants. By using the amine catalyst the reaction temperatures and reaction times can be reduced, thus providing for greater economical processes. The resulting product is a hydroxylated organosiloxane block copolymer having from 0.5 to 5 inclusive weight percent hydroxyl radicals, preferably from 1 to 4.5 inclusive weight percent hydroxyl radical.

The hydroxylated organosiloxane block copolymer is then endblocked with monoorganotriacetoxysilanes, such as methyltriacetoxysilane, ethyltriacetoxysilane, propyltriacetoxysilane, butyltriacetoxysilane, phenyltriacetoxysilane, pentyltriacetoxysilane, tnd vinyltriacetoxysilane. Mixtures of two or more monoorganotriacetoxysilanes can be used. This final step should be carried out under anhydrous conditions. The resulting product is the room temperature vulcanizable composition of the present invention.

In any of the processes described above, the reactions are preferably carried out in the presence of organic solvents and at temperatures ranging from below room temperature to the boiling point of the mixture. The reactions are carried out at temperatures from —30° C. to 130° C., preferably 20° to 50° C. Since the acetoxy functional silicon compounds are hydrolyzable by water, the reactions in which acetoxy groups are present are carried out under essentially anhydrous conditions. The final acetoxy functional organosiloxane block copolymers can be stripped of the by-products and excess reactants and any organic solvents, if so desired. It is not advisable to strip the compositions of this invention at temperatures in excess of 125° C.

The room temperature vulcanizable compositions can be prepared by reacting under anhydrous conditions a hydroxylated organosiloxane block copolymer within the limits set forth in (A) and (B) with a monoorganotriacetoxysilane of the formula

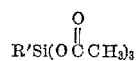

where R′ is defined above. The hydroxylated organosiloxane block copolymer would have the following composition. A polydiorganosiloxane block as defined in (A) is present in an amount of from 23 to 88.4 mol percent, the organosiloxane block defined in (B) is present in an amount of from 11.6 to 77 mol percent and the hydroxylated organosiloxane block copolymer has from 0.5 to 5 amount of monoorganotriacetoxysilane reacted with the hyroxylated organosiloxane block copolymer is sufficient to provide from 2 to 27 mol percent based on the total number of siloxane units in the resulting product and sufficient enough to provide at least one molecule of monoorganotriacetoxylsilane per hydroxyl radical in the hydroxylated organosiloxane block copolymer.

The hydroxylated organosiloxane block copolymers suitable for use in the present invention are known in the art and can be prepared by a number of methods. Additional details for the preparation of the hydroxylated organosiloxane block copolymers can be found in U.S. Pats. No. 3,280,214, No. 3,294,718, No. 3,328,481 and No. 3,436,439, which are hereby incorporated by reference.

A preferred embodiment of the present invention is a room temperature vulcanizable composition in which the acetoxy functional organosiloxane block copolymer consists essentially of (A) in which all the diorganosiloxane units are dimethylsiloxane units, the dimethylsiloxane units are present in an amount of from 41 to 62 inclusive mol percent, and said dimethylsiloxane units forming a polydimethylsiloxane block having 25 to 100 inclusive dimethylsiloxane units per block, (B) in which the organosiloxane units are present in an amount of from 28 to 47 inclusive mol percent, $x$ has an average value of from 1 to 1.1 inclusive, and said organic groups in R are at least 80 percent aryl radicals, and (C) in which the endblocking acetoxysiloxane units are present in an amount of from 5 to 21 inclusive mol percent and the organic groups of R' are alkyl radicals having from 1 to 5 inclusive carbon atoms.

The room temperature vulcanizable compositions of the preferred embodiment have advantageous physical properties of tensile strength and tear strength as well as excellent adhesive strength.

Another preferred embodiment of the present invention is a room temperature vulcanizable composition in which the acetoxy functional organosiloxane block copolymer consists essentially of (A) 16 to 29 inclusive mol percent of dimethylsiloxane units bonded through silicon-oxygen-silicon bonds forming a polydimethylsiloxane block having an average of from 6 to 100 inclusive dimethylsiloxane units per block, (B) 54 to 77 inclusive mol percent organosiloxane as defined above and (C) 2.5 to 23 inclusive mol percent of endblocking acetoxysiloxane units as defined above, the mol percentages of (A), (B) and (C) being based on the total number of siloxane units in the organosiloxane block copolymer. The polydimethylsiloxane block can have small amounts of monomethylsiloxane units as described herein without departing from the preferred embodiment. The room temperature vulcanizable compositions of this preferred embodiment are particularly useful as release coatings. These compositions when applied to a substrate surface in a film will cure at room temperature to a coating which adheres tenaciously to the substrate surface but the cured exposed surface will readily release ordinarily sticky materials. Such coatings of 15 mils thickness or greater are particularly useful in coating cooking utensiles which come in contact with sticky and adhesive foods.

The room temperature vulcanizable compositions of the present invention can also include fillers, pigments and other additives where desirable.

The room temperature vulcanizable compositions of the present invention are acetoxy functional organosiloxane block copolymers which are useful as adhesives, particularly those in which (A) is present in an amount from 24 to 84 inclusive mol percent and the polydiorganosiloxane block has an average of from 15 to 350 inclusive diorganosiloxane units per block, (B) is present in an amount from 11 to 68 inclusive mol percent and (C) is present in an amount from 2 to 27 inclusive mol percent. The adhesive property of the block copolymers of the present invention is completely unexpected, since the strength of the adhesive bonds could not be predicted from previous compositions. The improved adhesive properties are not limited to any single class of substrates which can be bonded by the block copolymers of the present invention. Examples of substrates which can be adhered together include, glass, ceramics, metals such as aluminum, steel and copper, wood, paper, thermoplastics, such as polystyrene, and polyvinylchloride, cellulose acetate-butyrate, leather and plexiglas.

In addition to the adhesive property, the acetoxy functional organosiloxane block copolymers of the present invention also are film formers and are useful as coating compositions. The acetoxy functional organosiloxane block copolymers cure at room temperature to clear films with high tensile and tear strengths.

The acetoxy functional organosiloxane block copolymers of the present invention have excellent shelf stability when stored under anhydrous conditions. No change in viscosity of these products are observed when stored under anhydrous conditions at 70° C. over a three month period.

The extrusion rate of the acetoxy functional organosiloxane block copolymers of the present invention may not be as high as desirable for all applications such as an adhesive to be applied from a collapsible tube. The extrusion rate can be increased by adding diluents to the acetoxy functional organosiloxane block copolymer of this invention. The diluents can be either reactive or non-reactive. A non-reactive diluent would include organic solvents, for example, chlorothene, ethers, toluene, esters and the like. Organic solvents can be used to deposit a film of the acetoxy functional organosiloxane block copolymer when used as a coating composition. A reactive diluent can include acetoxy functional silicon compounds such as acetoxysilanes, such as monomethyltriacetoxysilane and acetoxysiloxanes, among others. Monomethyltriacetoxysilane, as the diluent, can be used to control the extrusion rate and in addition the mixture of monomethyltriacetoxysilane and the acetoxy functional organosiloxane block copolymers when cured, unexpectedly provide a highly arc resistant product. The amount of monomethyltriacetoxysilane required to provide the highly arc resistant product can be from 10 to 30 weight percent based on the weight of the acetoxy functional organosiloxane block copolymer, preferably from 15 to 20 weight percent. The amount of monomethyltriacetoxysilane which will increase the extrusion rate can be from 2 to 30 weight percent based on the weight of the acetoxy functional organosiloxane block copolymer, preferably from 2 to 15 weight percent. Other acetoxysilanes of the formula

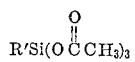

can be used in place of the monomethyltriacetoxysilane. Some sacrifice of physical properties such as tensile and tear strengths are observed when reactive diluents are used, however, since the gain of extrusion rate and arc resistance is much greater than the loss of these physical properties, the mixtures of the acetoxy functional organosiloxane block copolymers and reactive diluents provide commercially acceptable adhesives and electrical insulating materials.

The extrusion rate can be enhanced by the addition of other acetoxy functional materials, such as polydimethylsiloxane and polyphenylmethylsiloxane endblocked with

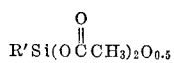

These additives also provide a more elastomeric adhesive.

The following examples are only presented for illustrative purposes and should not be construed as limiting the present invention which is properly delineated in the claims.

EXAMPLE 1

(A) Preparation of Block Copolymer, Method A: A mixture of hydroxyl endblocked polydimethylsiloxane having an average of 34 dimethylsiloxane units per molecule, toluene, hydrochloric acid and water to provide about 10 weight percent hydrogen chloride was placed in a flask equipped with an agitator and thermometer. To this mixture, a mixture of phenyltrichlorosilane, methylphenyldichlorosilane and toluene was added with agitation. After the addition, the reaction mixture was stirred for 30 minutes, washed with water and then azeotroped to remove the residual hydrogen chloride and water from the product which was a hydroxylated block copolymer having polydimethylsiloxane blocks and blocks composed of monophenylsiloxane units and methylphenylsiloxane units. This method which was used is further described in greater detail in U.S. Pat. No. 3,294,718. The amounts of the various portions of the block copolymers prepared are shown in Table I in mol percentages based on the siloxane units in the hydroxylated block copolymers.

(B) Preparation of Block Copolymer, Method B: A hydroxyl endblocked polydimethylsiloxane was mixed with a phenyltriacetoxysilane in a ratio of one mole of phenyltriacetoxysilane to one mole of silicon-bonded hydroxyl. The mixture was allowed to react for one hour at room temperature under anhydrous conditions. The resulting porduct was essentially a phenyldiacetoxysiloxy endblocked polydimethylsiloxane. The phenyldiacetoxysiloxy endblocked polydimethylsiloxane was mixed with a hydroxylated phenylsiloxane resin and then the mixture was heated for about 2.5 hours at 80° C. The resulting product was a hydroxylated block copolymer similar to the hydroxylated block copolymer obtained for Method A. The amounts of the various portions of the block copolymers prepared are shown in Table I in mol percentages based on the siloxane units in the hydroxylated block copolymers.

(C) A hydroxylated block copolymer prepared by Method A or Method B was put into a toluene solution to provide a solution of about 40 weight percent hydroxylated block copolymer. To this solution a monoorganotriacetoxysilane was rapidly added. The amount of silane was sufficient to provide at least one mole of silane for one mole of silicon-bonded hydroxy radical of the hydroxylated block copolymer. The reaction was exothermic and after agitating for one hour, the volatile materials, including excess silane, acetic acid, and toluene were stripped from the reaction mixture by heating to 150° C. under reduced pressure of about 30 to 40 mm. of Hg. The resulting product was an acetoxy functional block copolymer which was stored under anhydrous conditions.

(D) The physical properties of the cured acetoxy functional block copolymers were determined by preparing test specimens. The test specimens were prepared by casting the acetoxy functional block copolymer in 4 inch by 4 inch chase mold with a polytetrafluoroethylene backing. The molds were then exposed for seven days at 50% relative humidity and room temperature. The test specimens were from 20 to 50 mils in thickness. The tensile strength and elongation were determined by ASTM-D-412-64T procedure pulling at 2 inches per minute. The tensile strengths are given in pounds per square inch and the elongation is given in percent. The tear strength was determined by ASTM-D-624-54 procedure Die B by pulling at 2 inches per minute. The tear strengths are given in pounds per inch.

The adhesion was determined by butt joints for glass and ceramic and lap shear joints for other substrates. The test joints were prepared by applying a light coat of the acetoxy functional block copolymer to each of the adherents which were then pressed together and left undisturbed for 24 hours. After 24 hours any excess of the block copolymer was removed and then the adhesive strength was determined after some defined cure at room temperature, usually seven days. The adhesive strength was recorded as pounds per square inch as determined in the same manner as tensile strength pulling at 2 inches per minute. The butt joints are placed together and allowed to cure whereas the lap shear joints are clamped together and then allowed to cure.

TABLE I.—BLOCK COPOLYMERS PREPARED BY METHOD A

Mol percent of various siloxane units from resin block

| Reference No. | [a] | $C_6H_5SiO_{1.5}$ | $(C_6H_5)(CH_3)SiO$ | $(C_6H_5)_2SiO$ | $(CH_3)_2SiO$ | [b] | [c] | [d] |
|---|---|---|---|---|---|---|---|---|
| 1 | | 60 | 36 | 4 | | 2.22 | $CH_3Si(OCCH_3)_3$ with O above C | 31.9 |
| 2 | | 60 | 36 | | 4 | 2.45 | Same as above | 35.3 |
| 3 | | 60 | 36 | | 4 | 3.60 | do | 47.0 |
| 4 | | 60 | 34 | 6 | | 0.60 | do | 32.7 |
| 5 | | 62 | 32 | 6 | | 1.02 | do | 28.7 |
| 6 | | 62 | 34 | 4 | | 1.50 | do | 32.7 |
| 7 | | 65 | 31 | | 4 | 1.70 | do | 32.7 |
| 8 | | 65 | 31 | 4 | | 3.40 | [e] | 53.9 |
| 9 | | 65 | 31.5 | | 3.5 | 3.80 | [e] | 59.3 |
| 10 | | 70 | 26 | 4 | | 2.80 | [e] | 53.9 |
| 11 | | 50 | 35 | 5 | 10 | 1.86 | $CH_3Si(OCCH_3)_3$ | 45.7 |
| 12 | | 50 | 35 | 15 | | 1.45 | Same as above | 45.7 |
| 13 | | 60 | 36 | 4 | | 2.80 | [e] | 59.3 |
| 14 | | 60 | 36 | 4 | | 1.70 | [e] | 27.0 |
| 14A | | 60 | 36 | 4 | | 2.4 | [e] | 59.3 |

BLOCK COPOLYMERS PREPARED BY METHOD B

| 15 | | 56 | 40 | 4 | | 1.44 | $CH_3Si(OCCH_3)_3$ | 32.7 |
| 16 | | 56 | 40 | 4 | | 1.44 | $[(CH_3CO)_2Si\begin{smallmatrix}O\\\|\end{smallmatrix}\,CH_3]_2O$ | 49.7 |
| 17 | | 56 | 40 | 4 | | 2.00 | $CH_3Si(OCCH_3)_3$ | 32.7 |
| 18 | | 56 | 40 | 4 | | 1.70 | Same as above | 32.7 |
| 19 | | 56 | 40 | 4 | | 1.7 | do | 58.8 |

[a] Mol percent dimethylsiloxane units from polydimethylsiloxane block.
[b] Weight percent silicon-bonded hydroxyl radicals on block copolymer.
[c] Monoorganotriacetoxysilane used.
[d] Grams of monoorganotriacetoxysilane used 100 grams of hydroxylated block copolymer.
[e] Mixture of $CH_3Si(OCCH_3)_3$ and $CH_3CH_2Si(OCCH_3)_3$ mol ratio 1:1.

TABLE II.—PHYSICAL PROPERTIES OF CURED PRODUCT

| Reference number | Durometer, Shore A scale | Tensile strength at break, p.s.i. | Elongation at break, percent | Tear strength die "B," p.p.i. | Extrusion rate, grams/ minute |
|---|---|---|---|---|---|
| 1 | 89 | 1,053 | 13 | 294 | 8.4 |
| 2 | 83 | 1,141 | 80 | 320 | 6.3 |
| 3 | 91 | 1,203 | 40 | 274 | |
| 4 | 92 | 977 | 53 | 276 | 6.0 |
| 5 | 90 | 1,108 | 53 | 283 | 144 |
| 6 | 89 | 989 | 63 | 294 | |
| 7 | 89 | 1,060 | 43 | 241 | 50 |
| 8 | 85 | 697 | 23 | 134 | 276 |
| 9 | 85 | 1,059 | 23 | 195 | 180 |
| 10 | 79 | 550 | 23 | 80 | 718 |
| 11 | 81 | 1,200 | 25 | 193 | 2.0 |
| 12 | 95 | 1,250 | 25 | 317 | 1.1 |
| 13 | 76 | 1,009 | 36 | 213 | |
| 14 | | 741 | 45 | 179 | 187 |
| 14A | 83 | 888 | 20 | 221 | |
| 15 | 81 | 1,080 | 20 | 348 | 43 |
| 16 | 95 | 1,360 | 22 | 300 | 132 |
| 17 | 87 | 1,320 | 13 | 339 | 13 |
| 18 | 73 | 1,080 | 44 | 302 | 75 |
| 19 | 94 | 900 | 60 | 225 | 35 |

TABLE III

Adhesion in p.s.i., joint given in inches

| Reference No. | 1 x 7/32 glass (butt) | 1 15/16 x 1/4 ceramic (butt) | 1/2 x 1/2 wood (lap shear) | 1/2 x 1 steel (lap shear) | 1 x 1 polystyrene (lap shear) | 1 x 1 aluminum (lap shear) | 1 x 1 leather (lap shear) | 1 x 1 polyvinyl chloride (lap shear) | 1 x 1 cellulose acetate butyrate (lap shear) |
|---|---|---|---|---|---|---|---|---|---|
| 1 | 959 | **1,135 | | | | | | | |
| 5 | 959 | **1,156 | | | | | | | |
| 8 | 366 | 436 | | | | | | | |
| 9 | 449 | 516 | 368 | 334 | 105 | 150 | 59 | 128 | 243 |
| 10 | 384 | 415 | | | | | | | |
| 13 | | 248 | 532 | | 155 | 115 | 54 | | 250 |
| 14 | 700 | 508 | 372 | 360 | 156 | 192 | 36 | 172 | 250 |
| 14A | | 345 | 628 | | 113 | | 50 | | 250 |

EXAMPLE 2

To a 2000 ml. three-neck flask equipped with an agitator, thermometer and overhead water condenser was added 78.5 g. of hydroxyl endblocked polydimethylsiloxane having an average of 34 dimethylsiloxane units per molecule, 16.9 g. of monophenyltriacetoxysilane and 245.3 g. of toluene. The mixture was allowed to react for one hour at room temperature using mild agitation. Thereafter, a mixture of 97.6 g. of a copolymeric siloxane resin having 90 mol percent monophenylsiloxane units and 10 mol percent phenylmethylsiloxane units and 6.4 weight percent hydroxyl radicals and 80.9 g. of toluene was added. Also added at this time was a catalyst as indicated in Table IV. The reaction mixture was then heated to 50° C. under mild agitation until a drop of the reaction mixture remained clear on a glass slide after the solvent had evaporated. The time required to reach the point of clarity was recorded as the compatibility time. The resulting mixture was then cooled to 30° C. after the compatibility point was reached and 86 g. of methyltriacetoxysilane was added. The mixture was then allowed to react for 15 minutes at room temperature with mild agitation. The resulting mixture was then stripped to 100 percent solids by heating to 100° C. under a reduced pressure of 10 to 20 mm. of Hg. The resulting product was an acetoxy functional organosiloxane block copolymer having

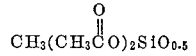

terminating units on the block copolymer having a polydimethylsiloxane block and a block of monophenylsiloxane units and phenylmethylsiloxane units wherein the amounts were 56 mol percent dimethylsiloxane units, 40 mol percent monophenylsiloxane units and 4 mol percent phenylmethylsiloxane units.

The various acetoxy functional organosiloxane block copolymers were cured and tested as described in Example 1. The physical properties are shown in Table IV and the adhesive properties are shown in Table V.

TABLE IV

| Reference No. | Catalyst used in preparation of hydroxylated block copolymer | Compatibility time, minutes | Extrusion rate, grams per minute | Durometer, Shore A scale | Tensile at break, p.s.i. | Elongation at break, percent | Tear strength die B, p.p.i. |
|---|---|---|---|---|---|---|---|
| 1 | None | (a) | 173 | 91 | 1,490 | 70 | 287 |
| 2 | 0.25 weight percent pyridine | 10 | 198 | 94 | 1,290 | 55 | 307 |
| 3 | 0.25 weight percent $\underset{CH_2CH_2CH_2}{\overset{CH_2CH_2CH_2}{N-CH_2CH_2CH_2-N}}$ | 27 | 54 | 87 | 1,380 | 45 | 310 |
| 4 | 0.25 weight percent n-butylamine | | 163 | 89 | 1,120 | 85 | 263 |
| 5 | 0.5 weight percent (CH₃O)₃SiCH₂CH₂CH₂NHCH₂CH₂NH₂ | 120 | 152 | 90 | 1,150 | 30 | 170 |
| 6 | 2.0 weight percent (CH₃O)₃SiCH₂CH₂CH₂NHCH₂CH₂NH₂ | 16 | | 61 | 1,150 | 15 | 217 |
| 7 | 0.5 weight percent pyridine | 5 | 49 | 92 | 1,240 | 50 | 287 |
| 8 | 0.5 weight percent alpha-picoline | 6 | 132 | 87 | 1,140 | 40 | 211 |
| 9 | 0.5 weight percent n-butylamine | 10 | 40 | 82 | 980 | 75 | 236 |
| 10 | 0.5 weight percent $\underset{CH_2CH_2CH_2}{\overset{CH_2CH_2CH_2}{N-CH_2CH_2CH_2-N}}$ | 16 | 64 | 96 | 1,375 | 40 | 262 |
| 11 | 0.2 weight percent pyridine | 17 | 85 | 93 | 1,060 | 60 | 260 |
| 12 | 0.2 weight percent pyridine acetate | 36 | 86 | 95 | 1,070 | 70 | 150 | a 25 hours.

TABLE V

Adhesion in p.s.i., joint given in inches

| Reference No. | 2 x 1/4 ceramic (butt) | 1 x 1/4 glass (butt) | 1 x 1/4 aluminum (lap shear) | 1 x 1 wood (lap shear) |
|---|---|---|---|---|
| 1 | *900 | 500 | 420 | 540 |
| 2 | 900 | 640 | 480 | 610 |
| 3 | 900 | 570 | 460 | 640 |
| 4 | 900 | 870 | 560 | 660 |
| 5 | 900 | | 600 | 680 |
| 6 | 900 | | 490 | 630 |

*Cohesive failure.

EXAMPLE 3

A copolymer was prepared by hydrolyzing a mixture of 56 mol percent dimethyldichlorosilane, 40 mol percent monophenyltrichlorosilane and 4 mol percent phenylmethyldichlorosilane. The resulting hydroxylated random copolymer was reacted with 45.2 g. of methyltriacetoxysilane per 100 g. of copolymer. The resulting product was stripped as described in Example 2. An acetoxy functional organosiloxane block copolymer as prepared in Example 2 was prepared. The two copolymers were cured and tested as described in Example 1.

| Physical property: | Acetoxy functional block copolymer | Acetoxy functional random copolymer |
|---|---|---|
| Durometer, Shore A scale | 85 | 52 |
| Tensile strength at break, p.s.i. | 1,020 | 60 |
| Elongation at break percent | 60 | 10 |
| Tear strength, die B, p.p.i. | 245 | 8 |
| Lap shear adhesion: | | |
| Glass | 740 | 66 |
| Aluminum | 530 | 66 |
| Wood | 740 | 27 |

EXAMPLE 4

An acetoxy functional organosiloxane block copolymer was prepared by the procedure described in Example 2. A hydroxyl endblocked polydimethylsiloxane having 300 dimethylsiloxane units permolecule was reacted with monophenyltriacetoxysilane to provide an acetoxy functional endblocked polydimethylsiloxane which was then reacted with the copolymeric siloxane resin described in Example 2. The resulting hydroxylated organosiloxane block copolymer was reacted with enough methyltriacetoxysilane to provide one mole of methyltriacetoxysilane per mole of silicon-bonded hydroxyl radical of the hydroxylated organosiloxane block copolymer. The resulting acetoxy functional organosiloxane block copolymer had monomethyldiacetoxysiloxy terminating units on a block copolymer composed of 63.4 mol percent of dimethylsiloxane units as the polydimethylsiloxane block and 33.0 mol percent monophenylsiloxane units and 3.6 mol percent phenylmethylsiloxane units as the other block.

The adhesive properties were tested as described in Example 1. The results were as follows:

| Substrate | Joint type | Adhesion, p.s.i. |
|---|---|---|
| Glass | Butt | 281 |
| Ceramic | do | 239 |
| Aluminum | Lap shear | 195 |
| Steel | do.° | 197 |
| Wood | do | 161 |

EXAMPLE 5

A hydroxylated organosiloxane block copolymer was prepared as described in Example 1, (B) having a polydimethylsiloxane and another block of monophenylsiloxane units and phenylmethylsiloxane units where the units were present in amounts of 58 mol percent dimethylsiloxane units, 38 mol percent monophenylsiloxane units and 4 mol percent phenylmethylsiloxane units. The resulting hydroxylated organosiloxane block copolymer was reacted with 58.1 g. of monophenyltriacetoxysilane per 100 g. of hydroxylated organosiloxane block copolymer. The resulting acetoxy functional organosiloxane block copolymer was cured and tested as described in Example 1. The results were as follows:

Durometer, Shore A scale _____ 97
Tensile strength at break, p.s.i. _____ 1350
Elongation at break, percent _____ 60
Tear strength, Die B, p.p.i. _____ 193

EXAMPLE 6

The acetoxy functional organosiloxane block copolymer of Example 1, Reference Number 1, was mixed with varying amounts of monomethyltriacetoxysilane as shown in Table VI. The mixtures were then cured and tested as described in Example 1. The results were as shown in Table VI.

TABLE VI

| Reference No. | Weight percent $CH_3Si(OCCH_3)_3$* | Extrusion rate, grams/minute | Durometer, Shore A scale | Tensile strength at break, p.s.i. | Elongation at break, percent | Tear strength die B p.p.i |
|---|---|---|---|---|---|---|
| 1 | 0.0 | 8.4 | 89 | 1,053 | 13 | 294 |
| 2 | 2.5 | 11.0 | 90 | 750 | 30 | 149 |
| 3 | 5.0 | 24.0 | 84 | 763 | 20 | 153 |
| 4 | 10.0 | 82.0 | 94 | 747 | 50 | 148 |
| 5 | 15.0 | 216.0 | 89 | 710 | 10 | 143 |

*Based on 100 parts by weight of the acetoxy functional organosiloxane block copolymer.

EXAMPLE 7

The acetoxy functional organosiloxane block copolymer of Example 2 was mixed with varying amounts of monomethyltriacetoxysilane as shown below. The mixtures were cured as shown and then tested for arc resistance in accordance with the method described in ASTM–D–495. The times recorded were the seconds before failure.

AFTER SEVEN DAYS EXPOSURE TO AIR AT ROOM TEMPERATURE AND ONE HOUR AT 350° F.

| Weight percent $CH_3Si(OCCH_3)_3$* | Arc resistance, seconds |
|---|---|
| 7.6 | 36 |
| 10.4 | 150 |
| 12.8 | 190 |
| 15.6 | 190 |
| 18.0 | 210 |
| 20.8 | 190 |
| 26.0 | 190 |

*Based on 100 parts by weight acetoxy functional organosiloxane block copolymer.

VARIOUS CURES

| 18 weight percent $CH_3Si(OCCH_3)_3$ | Arc resistance, seconds |
|---|---|
| Seven days at room temperature | 124 |
| Plus one hour at 350° F | 183 |
| Plus 24 hours at 350° F | 420 |

The hydroxylated organosiloxane block copolymer of Example 2 was cured with an amine catalyst, molded for 30 minutes at 300° F. and post cured for 25 hours at 350° F. The arc resistance was 123 seconds.

EXAMPLE 8

A mixture of 12.1 pounds of hydroxyl endblocked polydimethylsiloxane of Example 1, 26.8 pounds of toluene and 4.8 pounds of a toluene solution having 54.3 weight percent monophenyltriacetoxysilane was agitated for 30 minutes at 50° C. To the resulting monophenyldiacetoxysiloxy endblocked polydimethylsiloxane, 27.5 pounds of a toluene solution having 56.1 weight percent of a hydroxylated resin having 90 mol percent monophenylsiloxane units and 10 mol percent methylphenylsiloxane units and 0.2 pounds of normal butylamine was added and the mixture was agitated for one hour. To the resulting hydroxylated organosiloxane block copolymer, 13.3 pounds of monomethyltriacetoxysilane was added and the mixture was agitated for five minutes and then stripped to 100° C. at a pressure of about 10 mm. of Hg to remove any excess monomethyltriacetoxysilane, acetic acid and the toluene. The resulting monomethyldiacetoxysiloxy endblocked organosiloxane block copolymer was cured and tested as an adhesive as described in Example 1. The results were as shown below:

| Substrate: | Adhesive strength, p.s.i. |
|---|---|
| Glass | 740 |
| Ceramic | 744 |
| Wood | 828 |
| Aluminum, unprimed | 532 |
| Aluminum, primed | 840 |
| Steel, unprimed | 528 |
| Steel, primed | 820 |

EXAMPLE 9

A mixture of 144.0 grams of the hydroxyl endblocked polydimethylsiloxane of Example 1, 360.0 grams of reagent grade toluene and 60.2 grams of a toluene solution of 49.5 weight percent monophenyltriacetoxysilane was agitated for one hour at 23 to 30° C. To the resulting monophenyldiacetoxysiloxy endblocked polydimethylsiloxane solution, 178.0 grams of the hydroxylated resin of Example 8 was added and the mixture was agitated for two hours at 80 to 90° C. and then cooled to room temperature. To the cooled solution of the resulting hydroxylated organosiloxane block copolymer, 214.0 grams of the toluene solution of the monophenyltriacetoxysilane was added and the mixture was agitated for one hour at room temperature. The resulting monophenyldiacetoxysiloxy endblocked organosiloxane block copolymer was then stripped to 100° C. at about 10 mm. of Hg to remove any excess monophenyltriacetoxysilane, the toluene and the acetic acid by-product. The monophenyldiacetoxysiloxy endblocked organosiloxane block copolymer was then cured and tested as an adhesive as described in Example 1. The results were as follows:

| Substrate: | Adhesive strength, p.s.i. |
|---|---|
| Glass | 380 |
| Ceramic | 916 |
| Wood, birch | 572 |

EXAMPLE 10

When 24 mols of a hydroxy endblocked polydiorganosiloxane having an average of 350 siloxane units per molecule and having 80 mol percent dimethylsiloxane units, 10 mol percent phenylmethylsiloxane units and 10 mol. percent monomethylsiloxane units is mixed with 0.15 mol of monovinyltri(methylethylketoxime)silane and the mixture is allowed to agitate for one hour, a monovinyldi(methylethylketoxime)siloxy endblocked polydiorganosiloxane is obtained. To this product, 67.85 mols of an organosiloxane resin having 55 mols of monophenylsiloxane units, 5 mols of monopropylsiloxane units and 7.85 mols of a methylnaphthylsiloxane units is added and the resulting mixture is agitated for one hour at 75° C. whereby a hydroxylated organosiloxane block copolymer is obtained. To the hydroxylated organosiloxane block copolymer, 8 mols of a mixture of monoorganotriacetoxysilanes is added and agitated for two hours at room temperature and then stripped to 100° C. at 10 mm. of Hg. The mixture of monoorganotriacetoxysilane is composed of 6 mols of vinyltriacetoxysilane and 2 mols of amyltriacetoxysilane. The resulting acetoxy functional organosiloxane block copolymer is an adhesive for ceramics.

EXAMPLE 11

When 84 mols of a hydroxyl endblocked polydimethylsiloxane having an average of 50 dimethylsiloxane units per molecule is mixed with 3.36 mols of monoethyltriacetoxysilane and the mixture is allowed to agitate for one hour at 70° C., a monoethyldiacetoxysiloxy endblocked polydimethylsiloxane is obtained. To this product, 7.64 mols of hydroxylated monophenylsiloxane resin having 10 weight percent hydroxyl radicals is added and the mixture is agitated for 40 minutes at 85° C. whereby a hydroxylated organosiloxane block copolymer is obtained. To the hydroxylated organosiloxane block copolymer, 5 mols of monoisopropyltriacetoxysilane is added and the mixture is agitated for one hour at 40° C. and then stripped to 100° C. at 15 mm. of Hg to remove the volatiles. The resulting acetoxy functional organosiloxane block copolymer is an adhesive for ceramic.

EXAMPLE 12

When 30 mols of a hydroxyl endblocked polydiorganosiloxane having 98 mol percent dimethylsiloxane units and 2 mol percent phenylmethylsiloxane units and having an average of 15 diorganosiloxane units per molecule is mixed with 4 mols of monoxenyltrichlorosilane and agitated for 20 minutes at room temperature, a monoxenyldichlorosiloxy endblocked polydiorganosiloxane is obtained. To this product, 39 mols of a hydroxylated organosiloxane resin having 30 mols of monophenylsiloxane units and 9 mols of monotolylsiloxane units is added and the mixture is agitated for 4 hours at 120° C. whereby a hydroxylated organosiloxane block copolymer is obtained. To the hydroxylated organosiloxane block copolymer, 27 mols of monomethyltriacetoxysilane is added and the mixture is agitated at 80° C. for one hour and then stripped to 120° C. at 6 mm. of Hg. The resulting acetoxy functional organosiloxane block copolymer is an adhesive.

EXAMPLE 13

When 48 mols of a hydroxyl endblocked polydimethylsiloxane having an average of 115 dimethylsiloxane units per molecule is mixed with 0.84 mol of monophenyltriacetoxysilane and agitated for 30 minutes at 60° C., a monophenyldiacetoxysiloxy endblocked polydimethylsiloxane is obtained. To this product, 49.16 mols of a hydroxylated organosiloxane resin having 40 mols of monophenylsiloxane units and 9.16 mols of monopropylsiloxane units is added and the mixture is agitated for one hour at 70° C. whereby a hydroxylated organosiloxane block copolymer is obtained. To the hydroxylated organosiloxane block copolymer, 2 mols of monomethyltriacetoxysilane is added and the mixture is agitated for one hour at room temperature and then stripped to 115° C. at 20 mm. of Hg to provide an acetoxy functional organosiloxane block copolymer which is an adhesive.

EXAMPLE 14

When 16 mols of a hydroxyl endblocked polydimethylsiloxane having an average of six dimethylsiloxane units per molecule is mixed with 5.34 mols of monomethyltriacetoxysilane and the mixture is allowed to agitate for one hour at 70° C., a monomethyldiacetoxysiloxy endblocked polydimethylsiloxane is obtained. To this product, 71.66 mols of hydroxylated siloxane resin having 45 mol percent monomethylsiloxane units, 40 mol percent monophenylsiloxane units, 10 mol percent diphenylsiloxane units and 5 mol percent phenylmethylsiloxane units is added and the mixture is agitated for one hour at 80° C. whereby a hydroxylated organosiloxane block copolymer is obtained. To the hydroxylated organosiloxane block copolymer, 7 mols of monomethyltriacetoxysilane is added and the mixture is agitated for 4 hours at room temperature and then stripped to 100° C. at 10 mm. of Hg to remove the volatiles. The resulting acetoxy functional organosiloxane block copolymer when dissolved in chlorothene to provide a 20 weight percent solution, then applied to a frying pan and allowed to air cure for 24 hours provides a release coating for foods.

EXAMPLE 15

When 29 mols of a hydroxyl endblocked polydimethylsiloxane having an average of 100 dimethylsiloxane units per molecule is mixed with 0.58 mol of monomethyltriacetoxysilane and the mixture is allowed to agitate for 1.5 hours at 50° C., a monomethyldiacetoxysiloxy endblocked polydimethylsiloxane is obtained. To this product, 53.42 mols of the hydroxylated siloxane resin of Example 14 is added and the mixture is agitated for 40 minutes at 90° C.

whereby a hydroxylated organosiloxane block copolymer is obtained. To this hydroxylated organosiloxane block copolymer, 17 mols of monomethyltriacetoxysilane is added and the mixture is agitated for 2 hours at 50° C. and then stripped to 100° C. at 14 mm. of Hg to remove the volatiles. The resulting acetoxy functional organosiloxane block copolymer provides a release coating as described in Example 14.

That which is claimed is:

1. A room temperature vulcanizable composition stable in the absence of moisture and curable upon exposure to moisture consisting essentially of an organosiloxane block copolymer consisting essentially of (A) 16 to 84 inclusive mol percent of diorganosiloxane units wherein the diorganosiloxane units are bonded through silicon-oxygen-silicon bonds forming a polydiorganosiloxane block having an average of from 6 to 350 inclusive diorganosiloxane units per block, said polydiorganosiloxane being at least 80 mol percent dimethylsiloxane units based on the total number of siloxane units in the polydiorganosiloxane and any remaining units being selected from the group consisting of phenylmethylsiloxane units and monomethylsiloxane units, (B) 11 to 77 inclusive mol percent organosiloxane units having an average formula

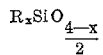

where $x$ has a value of from 1 to 1.3 inclusive and R is an organic group selected from the group consisting of aryl radicals, methyl radicals, vinyl radicals, ethyl radicals and propyl radicals, said organic groups being at least 50 percent aryl radicals based on the total number of organic groups in (B), said organosiloxane units comprise a block of at least 3 organosiloxane units, and said organosiloxane units being selected from monoorganosiloxane units and diorganosiloxane units, and (C) 2 to 27 inclusive mol percent of endblocking acetoxysiloxane units of the formula

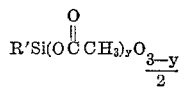

where $y$ has an average value from 1.8 to 2 inclusive and R′ is an organic radical selected from the group consisting of alkyl radicals having from 1 to 5 inclusive carbon atoms, phenyl radicals and vinyl radicals, the mol percentages of (A), (B) and (C) being based on the total number of siloxane units in the organosiloxane block copolymer.

2. The room temperature vulcanizable composition of claim 1 wherein the diorganosiloxane units of (A) are present in an amount of from 24 to 84 inclusive mole percent and the polydiorganosiloxane has an average of from 15 to 350 inclusive diorganosiloxane units per blocks and the organosiloxane units of (B) are present in an amount of from 11 to 68 inclusive mol percent.

3. The room temperature vulcanizable composition of claim 2 wherein the diorganosiloxane units of (A) are present in an amount of from 37 to 65 inclusive mol percent, the organosiloxane units of (B) are present in an amount of from 25 to 52 inclusive mol percent and the endblocking acetoxy-siloxane units of (C) are present in an amount of from 2 to 25 inclusive mol percent.

4. The room temperature vulcanizable composition of claim 2 in which all the diorganosiloxane units are dimethyl-siloxane units, R is aryl and R′ is methyl.

5. The room temperature vulcanizable composition of claim 2 in which all the diorganosiloxane units are dimethylsiloxane units, R is aryl and some R′ is methyl and the remaining is ethyl.

6. The room temperature vulcanizable composition of claim 2 in which all the diorganosiloxane units of (A) are dimethylsiloxane units, the dimethylsiloxane units are present in an amount of from 41 to 62 inclusive mol percent, said dimethylsiloxane units forming a polydimethylsiloxane block having 25 to 100 inclusive dimethylsiloxane units per block, the organosiloxane units of (B) are present in an amount of from 28 to 47 inclusive mol percent, $x$ has an average value of from 1 to 1.1 inclusive, said organic groups in R are at least 80 percent aryl radicals, the endblocking acetoxysiloxane units of (C) are present in an amount of from 5 to 21 inclusive mol percent, and the organic groups of R′ are alkyl radicals having from 1 to 5 inclusive carbon atoms.

7. The room temperature vulcanizable composition of claim 6 wherein the aryl radicals are phenyl radicals and the alkyl radicals are methyl radicals.

8. The room temperature vulcanizable composition of claim 6 wherein the aryl radicals are phenyl radicals and some of the alkyl radicals are methyl radicals and the remaining alkyl radicals are ethyl radicals.

9. The room temperature vulcanizable composition of claim 2 admixed with a reactive acetoxy silicon diluent.

10. The room temperature vulcanizable composition of claim 2 admixed with

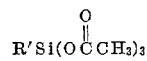

in an amount of from 2 to 30 inclusive weight percent based on the weight of the organosiloxane block copolymer.

11. The room temperature vulcanizable composition of claim 10 in which R′ is a methyl radical.

12. The room temperature vulcanizable composition of claim 11 in which

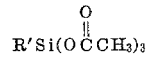

is present in an amount of from 2 to 15 weight percent.

13. The room temperature vulcanizable composition of claim 11 in which

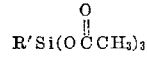

is present in an amount of from 10 to 30 inclusive weight percent.

14. The room temperature vulcanizable composition of claim 13 in which

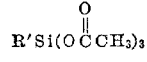

is present in an amount of from 15 to 20 inclusive weight percent.

15. The room temperature vulcanizable composition of claim 3 admixed with

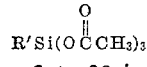

in an amount of from 2 to 30 inclusive weight percent based on the weight of the organosiloxane block copolymer.

16. The room temperature vulcanizable composition of claim 15 in which R′ is a methyl radical.

17. The room temperature vulcanizable composition of claim 4 admixed with

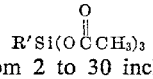

in an amount of from 2 to 30 inclusive weight percent based on the weight of the organosiloxane block copolymer.

18. The room temperature vulcanizable composition of claim 5 admixed with

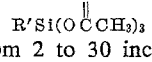

in an amount of from 2 to 30 inclusive weight percent based on the weight of the organosiloxane block copolymer.

19. The room temperature vulcanizable composition of claim 6 admixed with

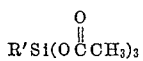

in an amount of from 2 to 30 inclusive weight percent based on the weight of the organosiloxane block copolymer.

20. The room temperature vulcanizable composition of claim 19 in which R' is a methyl radical.

21. The room temperature vulcanizable composition of claim 20 in which

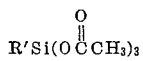

is present in an amount of from 2 to 15 inclusive weight percent.

22. The room temperature vulcanizable composition of claim 20 in which

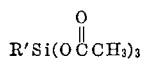

is present in an amount of from 10 to 30 inclusive weight percent.

23. The room temperature vulcanizable composition of claim 22 in which

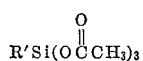

is present in an amount of from 15 to 20 inclusive weight percent.

24. The room temperature vulcanizable composition of claim 1 wherein the diorganosiloxane units of (A) are present in an amount of from 16 to 29 inclusive mol percent dimethylsiloxane units bonded through silicon-oxygen-silicon bonds forming a polydimethylsiloxane block having an average of from 6 to 100 inclusive dimethylsiloxane units per block, the organosiloxane units of (B) are present in an amount of from 54 to 77 inclusive mol percent and the endblocking acetoxysiloxane units are present in an amount of from 2.5 to 23 inclusive mol percent.

25. The cured composition of claim 1 after exposure to moisture.

26. The cured composition of claim 2 after exposure to moisture.

27. The cured composition of claim 10 after exposure to moisture.

28. The cured composition of claim 24 after exposure to moisture.

References Cited
UNITED STATES PATENTS

| | | | |
|---|---|---|---|
| 3,035,016 | 5/1962 | Bruner | 260—46.5 |
| 3,382,205 | 5/1968 | Beers | 260—825 |
| 3,440,205 | 4/1969 | Chadha et al. | 260—825 |

SAMUEL H. BLECH, Primary Examiner

U.S. Cl. X.R.

117—161 ZA; 161—193, 206, 207, 209; 260—31.2 R, 33.2 SB, 33.6 SB, 33.8 SB, 46.5 G